(12) United States Patent
Xiong et al.

(10) Patent No.: US 10,826,258 B2
(45) Date of Patent: Nov. 3, 2020

(54) COMBINED MULTIPATH CHARGER

(71) Applicant: GUANGDONG MARSHELL ELECTRIC VEHICLE CO., LTD., Guangdong (CN)

(72) Inventors: Min Xiong, Guangdong (CN); Xiaomin Xie, Guangdong (CN)

(73) Assignee: GUANGDONG MARSHELL ELECTRIC VEHICLE CO., LTD., Zhaoqing (CN)

( * ) Notice: Subject to any disclaimer, the term of this patent is extended or adjusted under 35 U.S.C. 154(b) by 0 days.

(21) Appl. No.: 16/621,236

(22) PCT Filed: Sep. 1, 2017

(86) PCT No.: PCT/CN2017/100153
§ 371 (c)(1),
(2) Date: Dec. 10, 2019

(87) PCT Pub. No.: WO2019/041300
PCT Pub. Date: Mar. 7, 2019

(65) Prior Publication Data
US 2020/0227876 A1    Jul. 16, 2020

(51) Int. Cl.
*H01R 31/06* (2006.01)
*H01R 13/514* (2006.01)
*H02J 7/00* (2006.01)

(52) U.S. Cl.
CPC ......... *H01R 31/065* (2013.01); *H01R 13/514* (2013.01); *H02J 7/0042* (2013.01)

(58) Field of Classification Search
CPC .... H01R 31/065; H01R 13/514; H02J 7/0042

USPC ........................................................ 439/638
See application file for complete search history.

(56) References Cited

U.S. PATENT DOCUMENTS

| 4,213,079 | A | * | 7/1980 | Mullersman | ........ H04L 47/2483 370/389 |
| 4,409,536 | A | * | 10/1983 | Evjen | .................. H01R 13/6271 174/54 |
| 5,413,507 | A | * | 5/1995 | Sawada | ................. H02J 7/0042 439/518 |
| 5,466,165 | A | * | 11/1995 | Boesel | ............... H01R 13/6666 439/142 |

(Continued)

FOREIGN PATENT DOCUMENTS

| CN | 204103535 U | 1/2015 |
| CN | 205319405 U | 6/2016 |

*Primary Examiner* — Harshad C Patel

(57) ABSTRACT

A combined multipath charger comprises charger main bodies and adapters. An inwards-recessed first female plug is disposed at the upper end of each charger main body. An outwards-raised first male plug matching the first female plug is disposed on the lower end of each adapter, and a second male plug and a second female plug matching with each other are disposed on opposite two side surfaces of each adapter. The adapter is inserted in the first female plug of the charger main body by means of the first male plug. The second male plug and the second female plug matching with each other are disposed on the opposite two side surfaces of the adapter and multiple adapters can be connected together in an abutting manner, accordingly, multiple main bodies in which the adapters are inserted can be placed together side by side.

6 Claims, 4 Drawing Sheets

(56) References Cited

U.S. PATENT DOCUMENTS

| | | | | |
|---|---|---|---|---|
| 7,018,233 B1* | 3/2006 | Griffin, III | ......... | H01M 2/1022 439/504 |
| 7,626,356 B2* | 12/2009 | Elgie | ................... | H01R 31/065 320/107 |
| 8,197,260 B2* | 6/2012 | Wadsworth | ......... | H01R 13/514 |
| 8,944,845 B2* | 2/2015 | Yu | ........................ | H02J 7/0042 439/518 |
| 9,577,395 B2* | 2/2017 | Ma | ....................... | H01R 31/065 |
| 9,991,657 B2* | 6/2018 | Powers | ................. | H05K 7/023 361/731 |
| 10,404,006 B2* | 9/2019 | Kawahara | ............ | H01R 13/514 |
| 10,541,501 B2* | 1/2020 | Hutchison | ............ | H01R 25/006 |
| 10,734,772 B2* | 8/2020 | Wu | ...................... | H01R 25/006 |
| 2001/0010986 A1* | 8/2001 | Maeda | .................. | H05K 7/023 361/731 |
| 2004/0218411 A1* | 11/2004 | Luu | ...................... | H01R 31/065 320/107 |
| 2007/0258202 A1* | 11/2007 | Cooley | ................ | H01R 31/065 361/679.4 |
| 2008/0012423 A1* | 1/2008 | Mimran | ............... | H01R 25/003 307/11 |
| 2012/0212177 A1* | 8/2012 | Peacock | ............... | H01R 31/065 307/150 |
| 2014/0051292 A1* | 2/2014 | Weaver, Jr. | ......... | H04L 47/2483 370/389 |
| 2014/0132085 A1* | 5/2014 | Lamb | ................... | H01R 31/065 307/150 |
| 2016/0134144 A1* | 5/2016 | Miller | ................... | H02J 7/0042 439/518 |
| 2016/0254628 A1* | 9/2016 | Liao | ....................... | H01R 24/76 439/535 |
| 2016/0276856 A1* | 9/2016 | Miller | ................... | H01R 24/76 439/535 |
| 2017/0238436 A1* | 8/2017 | Deros | ................... | H05K 7/023 361/731 |

\* cited by examiner

COMBINED MULTIPATH CHARGER

TECHNICAL FIELD

The present application relates to vehicle charging apparatus, and in particular to combined multipath chargers for vehicle charging.

BACKGROUND

During charging a plurality of cars at the same time, each car needs to be provided with a charger, making it not easy to control. Moreover, each charger has to be equipped with a socket and an input line, leading to a messy charging site and insufficient sockets. For example, when charging four cars simultaneously, four ordinary chargers are necessary and dependent on each other. They are not easy to be placed, and it is inevitable that many cables are required. Further, it is inconvenient to manage them due to four sockets for four chargers.

SUMMARY

The present application provides a combined multipath charger that can be coupled together side by side.

In one embodiment, a combined multipath charger is provided, including:

a charger main body having an inwards-recessed first female plug arranged at the upper end thereof; and an adapter having an outwards-raised first male plug matching the first female plug, wherein a second male plug and a second female plug matching with each other are arranged on opposite two side surfaces of the adapter, and the adapter is inserted in the first female plug of the charger main body by means of the first male plug.

Further, opposite two side surfaces of the charger main body are provided with a sliding chute and a sliding block matching with each other, and the opposite two side surfaces of the charger main body having the sliding chute and the sliding block are respectively located on the same side as the opposite two side surfaces of the adapter having the second male plug and the second female plug.

Further, the lower end of the adapter is provided with a downwardly extending hook, and the upper end of the charger main body is provided with a recess corresponding to the hook.

Further, a guiding slot is arranged on two sides of the upper end of the recess, and a slider for the blocking and pressing the hook is slidably mounted on the guiding slot, a V-shaped ramp is arranged on the lower surface of the slider, the hook of the adapter is inserted into one side of the inner side of the recess, the other side of the recess is provided with a prop, the lower end of the prop is fixed to the bottom of the recess by a spring, and the upper end of the prop abuts against the lower end of the slider.

Further, the upper end of the prop is provided with an inverted V-shaped ramp.

Further, the bottom of the recess is provided with a vertically upwardly extending guide post, the spring is sleeved on the guide post, the lower end of the prop is provided with a circular hole, and the circular hole of the prop is sleeved on the guide post on which the spring is mounted.

Further, the upper surface of the slider is provided with a bulge for pushing and displacing.

Further, a side wall of the recess is provided with a hanging slot, and the hook of the adapter can be hung in the hanging slot of the recess.

According to the combined multipath charger of the aforesaid embodiment, since the opposite two side surfaces of the adapter are provided with the second male plug and the second female plug which are mutually adapted, a plurality of adapters can be connected together in an abutting manner, accordingly, multiple charger main bodies in which the adapters are inserted can be placed together side by side, and the multiple charger main bodies arranged side by side can be respectively used for charging a plurality of electric vehicles. In this way, the combined multipath charger allows a plurality of charger main bodies and a plurality of adapters to be randomly combined to form a whole body, and the whole body only requires one input wire and can be freely separated and combined, and accordingly, it is easy to manage, saving space for use.

DETAILED DESCRIPTION

The present disclosure will be further described in detail below with reference to the accompanying drawings.

A combined multipath charger is provided in this embodiment. The opposite two sides of the charger are mutually matched docking structures, and a plurality of identical chargers can be docked together side by side for management and use.

Figure 1:
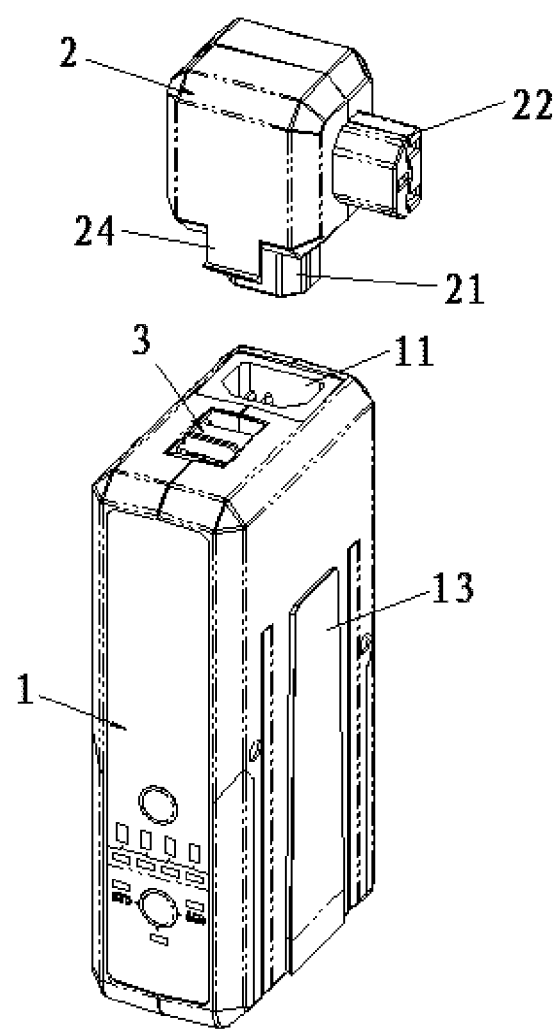
FIG. 1 is a schematic exploded view of a combined multipath charger in an embodiment.

As shown in FIG. 1, the combined multipath charger of the present embodiment primarily includes a charger main body 1 and an adapter 2. The adapter 2 is mounted at the upper end of the charger main body 1 for transmitting electrical energy to the charger main body 1.

Figure 2:
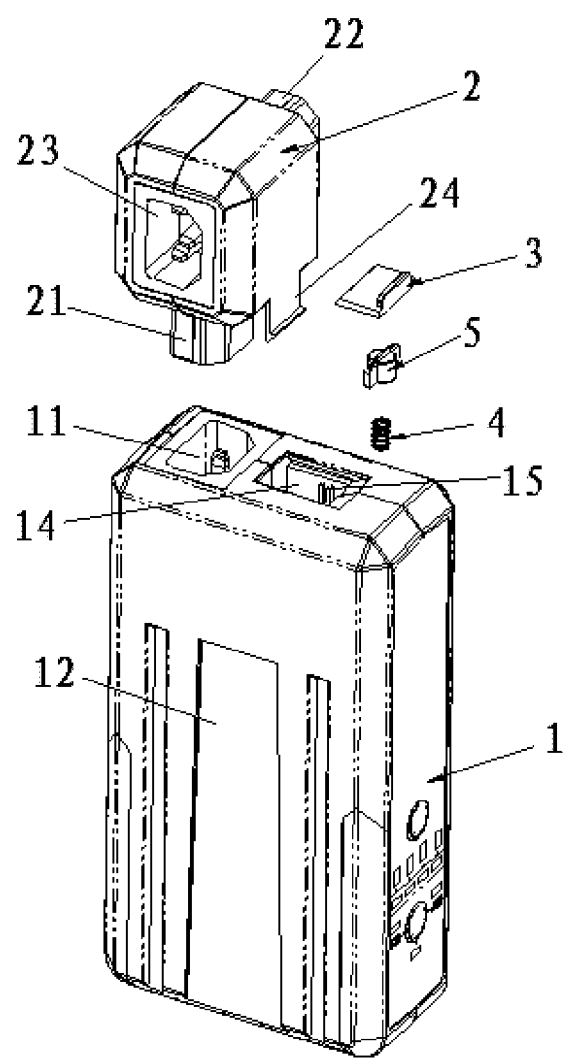
FIG. 2 is a schematic structural view of a combined multipath charger in an embodiment.

Specifically, as shown in FIG. 1 and FIG. 2, the front side of the charger main body 1 (the orientation in this embodiment refers to the orientation shown in FIG. 1) is provided with a port for charging an electric vehicle, and the upper end of the charger main body 1 is provided with an inwards-recessed first female plug 11. The left and right sides of the charger main body 1 are respectively provided with a sliding chute 12 and a sliding block 13 which are matched with each other, so that multiple identical charger main bodies 1 can be coupled together side by side by the sliding chutes 12 and the sliding blocks 13.

The lower end of the adapter 2 is provided with an outwards-raised first male plug 21. The first male plug 21 of the adapter 2 is adapted to the first female plug 11 of the charger main body 1, and the adapter 2 is inserted to and mounted on the first female plug 11 of the charger body 1 through the first male plug 21. A second male plug 22 and a second female plug 23 are respectively arranged on the left and right sides of the adapter 2, so that multiple identical adapters 2 can be docked together side by side through the second male plug 22 and the second female plug 23.

Figure 3:
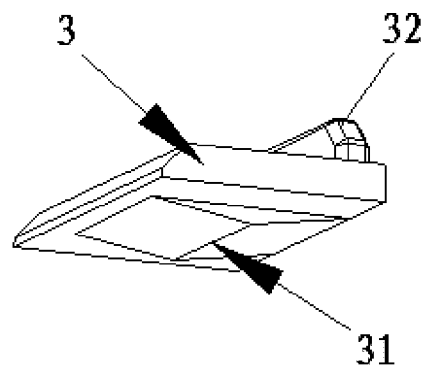
FIG. 3 is a schematic structural view of a slider in an embodiment.
Figure 4:
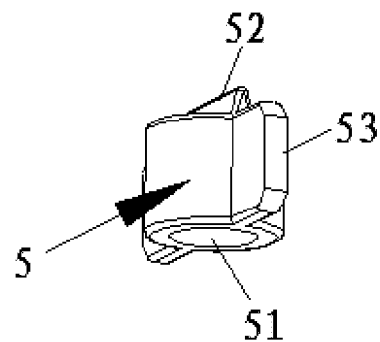
FIG. 4 is a schematic structural view of a prop in an embodiment.

In order to better fix the adapter 2 to the charger main body 1, the lower end of the adapter 2 is provided with a downwardly extending hook 24; correspondingly, the upper end of the charger main body 1 is provided with a recess 14. The upper end of the recess 14 is provided with a guiding slot on which a slider 3 is slidably mounted, and the slider 3 is movable along the guiding slot at the upper end of the recess 14. The hook 24 of the adapter 2 is inserted into one side of the recess 14, and the other side of the recess 14 is provided with a vertically upwardly extending guide post 15 on which a spring 4 is fitted and fixed. A prop 5 is arranged on the top end of the guide post 15 and the spring 4, as shown in FIG. 4. The lower end of the prop 5 has a circular hole 51, he prop 5 is mounted on the guide post 15 sleeved with the spring 4 through the circular hole 51 at the lower end, and the upper end of the prop 5 abuts against the lower end of the slider 3, so that the spring 4 always provides an upward force to the prop 5 to bear against the slider 3. As shown in FIG. 3, the lower surface of the slider 3 is provided with a V-shaped ramp 31, and the upper end of the prop 5 is provided with a small inverted V-shaped ramp 52, so that the upper end of the prop 5 can be pressed against the V-shaped ramp 31 of the slider 3 to bear against the slider 3 and the slider 3 blocks the hook 24, thereby firmly fixing the adapter 2 to the plurality of charger main bodies 1. When it needs to disassemble the combination, it can be simply accomplished by moving away the slider 3.

As shown in FIG. 4, the prop 5 can further be provided with barriers 53 on two sides thereof, and the barriers extend to contact with a side wall of the recesses 14, thereby increasing the stability of the prop 5 moving up and down.

In order to facilitate the movement of the slider 3, a bulge 32 for pushing and displacing is provided on the upper surface of the slider 3.

In another embodiment, a side wall of the recess 14 of the charger main body 1 is provided with a hanging slot, and the hook 24 of the adapter 2 is mounted in the hanging slot of the recess 14 for fixed installation. When disassembling is required, it can be realized by pressing the hook 24 having elasticity and withdrawing the hook 24 from the recess 14.

Figure 5:
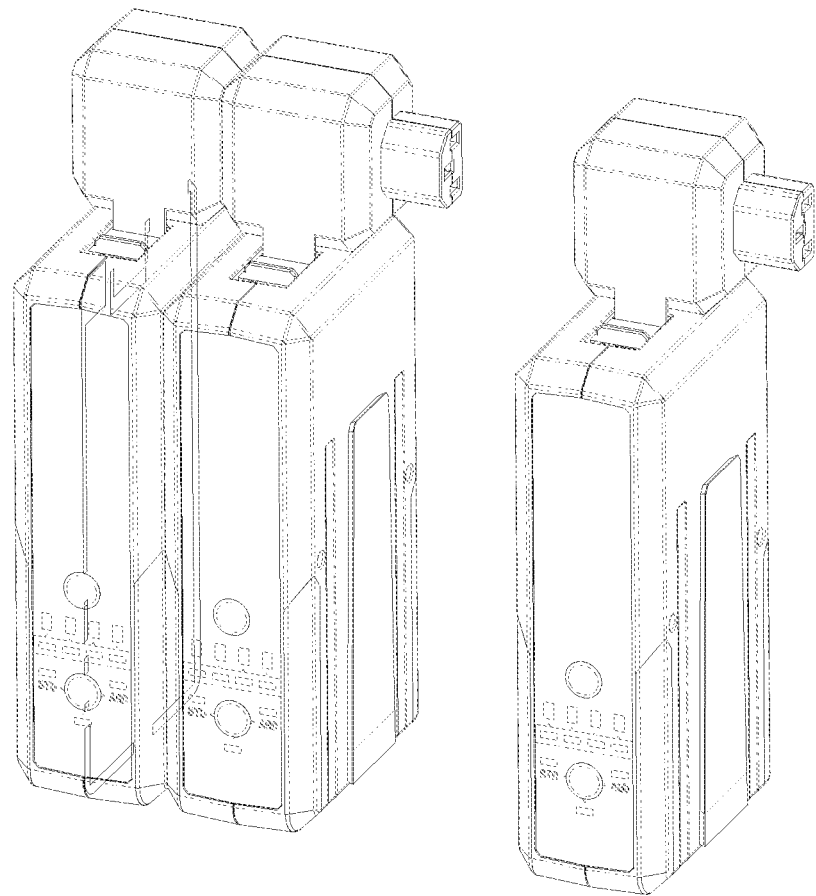
FIG. 5 is a schematic structural diagram of a combination of a plurality of combined multipath chargers in an embodiment.

As shown in FIG. 5, a plurality of combined multipath chargers of the embodiment can be coupled together side by side for use.

With the combined multipath chargers provided by the embodiment, multiple adapters can be connected together in an abutting manner by means of the second male plug 22 and the second female plug 23 matching with each other on the opposite two surfaces of the adapter 2, such that multiple main bodies 1 in which the adapters 2 are inserted to mount can be arranged together side by side for charging multiple electric vehicles respectively. In this way, the combined multipath charger can be obtained by randomly integrating a plurality of charger main bodies 1 with a plurality of adapters, which requires only one input wire and can be freely separated and combined, resulting in easy management and saving space for use.

The present disclosure has been described above with reference to specific examples, which are merely intended to aid the understanding of the invention and are not intended to limit the invention. For those skilled in the art, several simple derivations, variations or substitutions can be made in accordance with the concept of the present disclosure.

The invention claimed is:

1. A combined multipath charger, comprising:
    a charger main body having an inwards-recessed first female plug arranged at an upper end thereof; and
    an adapter having an outwards-raised first male plug matching the first female plug, a second male plug and a second female plug matching with each other arranged on opposite two side surfaces of the adapter, and the adapter inserted in the first female plug of the charger main body by means of the first male plug;
    wherein
    a downwardly extending hook is arranged at the lower end of the adapter, and a recess corresponding to the hook is arranged at the upper end of the charger main body; and
    a guiding slot is arranged on two sides of the upper end of the recess, a slider for blocking and pressing the hook is slidably mounted on the guiding slot and is provided with a V-shaped ramp at its lower surface, the hook of the adapter is inserted into one side of the recess, the other side of the recess is provided with a prop, the lower end of the prop is fixed to the bottom of the recess by a spring, and the upper end of the prop abuts against the lower end of the slider.

2. The combined multipath charger according to claim 1, wherein a sliding chute and a sliding block matching with each other arranged on opposite two side surfaces of the charger main body, and the opposite two side surfaces of the charger main body having the sliding chute and the sliding block are respectively located on the same side as the opposite two side surfaces of the adapter having the second male plug and the second female plug.

3. The combined multipath charger according to claim 1, wherein the upper end of the prop is provided with an inverted V-shaped ramp.

4. The combined multipath charger according to claim 1, wherein a vertically upwardly extending guide post is arranged at the bottom of the recess, the spring is sleeved on the guide post, a circular hole is arranged at the lower end of the prop, and the circular hole of the prop is sleeved on the guide post on which the spring is mounted.

5. The combined multipath charger according to claim 1, wherein a bulge for pushing and displacing is arranged on the upper surface of the slider.

6. The combined multipath charger according to claim 1, wherein a hanging slot is arranged on a side wall of the recess, and the hook of the adapter is able to be hung in the hanging slot of the recess.

* * * * *